Nov. 14, 1950
R. F. E. STEGEMAN
2,530,133
ILLUMINATING DEVICE FOR UNIFORMLY AND
DIFFUSELY ILLUMINATING A BACKGROUND
Filed June 8, 1946
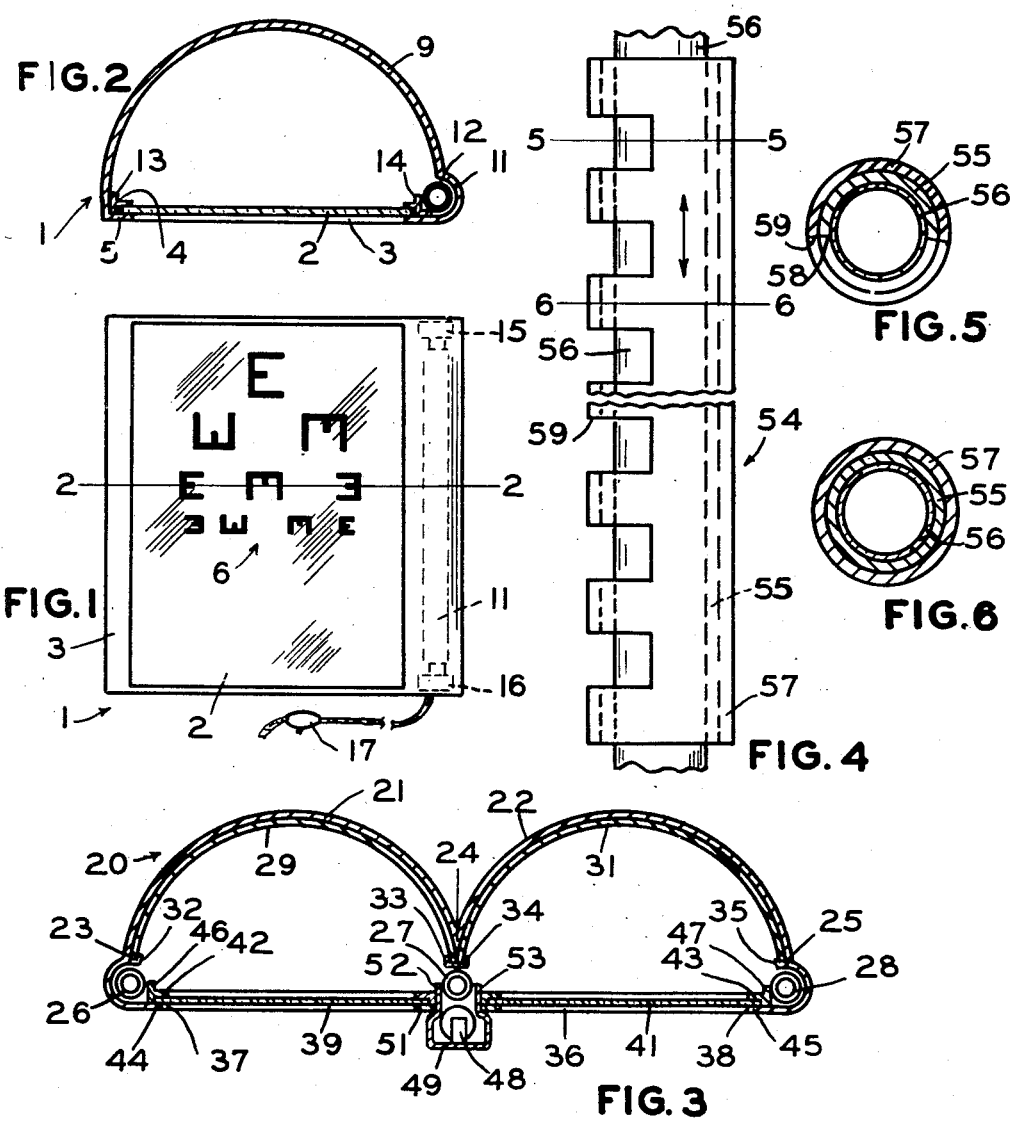
RAYMOND F.E. STEGEMAN
Inventor
Attorney Patented Nov. 14, 1950

2,530,133

UNITED STATES PATENT OFFICE 2,530,133

ILLUMINATING DEVICE FOR UNIFORMLY AND DIFFUSELY ILLUMINATING A BACKGROUND

Raymond F. E. Stegeman, Greece, N. Y., assignor to Bausch & Lomb Optical Company, Rochester, N. Y., a corporation of New York Application June 8, 1946, Serial No. 675,373

4 Claims. (Cl. 240—51.11)

The present invention relates to a device for uniformly and diffusely illuminating a background and more particularly to an apparatus for providing such a background in optical testing devices.

The principle used to produce illumination on the background in the present device is most nearly exemplified by the illumination of an integrating sphere in which a source of light when placed at the surface of the sphere uniformly illuminates the entire inner surface thereof. By way of comparison, the sphere in the present device is extended into a cylinder and substantially only half of the cylinder is utilized while the light source is linear and is positioned in alignment with and coextensive with the edge of the semicylinder.

It is an object of the present invention to provide a novel device of the above character for uniformly illuminating a background.

It is another object to provide such a device by utilizing principles similar to those used in illuminating an integrating sphere whereby a semicylinder is substituted for the sphere and an extended light source is substituted for the point source of light.

It is a further object to provide such a device in the form of an optical testing apparatus wherein opaque characters are displayed in silhouette before a uniformly lighted background.

It is another object to provide such a device in the form of an optical testing apparatus wherein the test characters may be quickly interchanged.

It is still a further object to provide such a device having means for controlling and directing light rays emanating from the source of light.

Further objects and advantages will be apparent to those killed in this art from the following description and accompanying drawing in which:

Fig. 1 is a front elevation of a device embodying my invention,

Fig. 2 is a sectional view taken on the line 2—2 of Fig. 1,

Fig. 3 is a horizontal sectional view of another embodiment of the invention,

Fig. 4 is a fragmentary side elevation of the dimming device for the illuminating lamps, Fig. 5 is a cross section taken on the line 5—5 of Fig. 4 showing the light-occluding shutter in open position, and Fig. 6 is a cross section taken on the line 6—6 of Fig. 4.

In Fig. 1 of the drawing a cabinet 1 of any preferred form is provided with means for displaying opaque characters, said means being in the form of a transparent display panel 2 of material such as sheet glass or clear plastic extending across the front wall 3. A framework 4 is attached by any suitable means to the cabinet 1 to furnish slots 5 to receive the transparent panel 2. The panel is so fitted within the slots 5 that it can be easily withdrawn when it is necessary to interchange the panels. The panel 2 has the opaque characters 6 formed thereon in any desired pattern, such, for instance, as found in optical testing charts, and by any suitable process such as photographically forming the characters on the surface of the panel 2 or adhesively securing them to it.

According to the present invention, means for uniformly and diffusely illuminating a background behind the characters 6 are provided in the form of a concave semicylindrical surface 9 of approximately a half circle in angular extent having along one of its longitudinal edges an extended diffuse light source in the form of a fluorescent tubular lamp 11. The lamp 11 is so located with reference to the edge 12 that the cylindrical surface 9, if produced, would extend through the longitudinal axis of the lamp. An analogy to the relative arrangement of the background surface 9 with the lamp 11, here shown, is found in the arrangement of the corresponding elements in the integrating sphere; the surface of the sphere being uniformly illuminated by a source of light placed at its spherical surface. By way of comparing the present device with the integrating sphere, the semicylinder in the present device is substituted for the sphere while the source of light is converted into an elongated tube having the same relative location to the surface as before. Therefore, the light incident on the background surface 9 has the same uniform illuminating effect as the light in an integrating sphere. For the purpose of reducing reflection to a minimum, means are provided for obtaining a dull white appearance on the background surface 9 by suitably roughening and coating it with a dull white paint.

The light shields 13 and 14 are provided so as to confine the light emanating from the lamp 11 to the angle subtended by the background. These light shields may be formed in any desired manner, but as here shown are designed as a part of the structure of the frame 4. Lamp 11 is positioned within the cabinet 1 by the brackets 15 and 16 and is connected to a suitable source of power which is controlled by switch 17.

In the embodiment of the invention shown in Fig. 3 a cabinet 20 is provided with two circular semicylindrical walls 21 and 22. Along the longitudinal inner boundaries 23, 24, and 25 of the walls 21 and 22, tubular fluorescent lamps 26, 27, and 28 are located in the same relation to the background surfaces 21 and 22 as those described in Figures 1 and 2. In this arrangement the total illumination on the background is twice the illumination afforded by the arrangement in Figs. 1 and 2 assuming that the same size lamp is used. The lamp 27 serves equally well for the two backgrounds 21 and 22 and could be used without the lamps 26 and 28 and still obtain the same kind of uniform illumination. It will be understood that the lamps 26, 27, and 28 are connected through transformers and suitable switching apparatus to a source of electrical power, not shown.

In Fig. 3 the means for producing a light-diffusing dull white surface on the backgrounds 21 and 22 is in the form of overlying white sheets 29 and 31 of plastic material suitably roughened to scatter the incident light. The sheets 29 and 31 are principally retained in concave form against the background walls 21 and 22 by the recesses 32, 33, 34, and 35 carried by the boundaries 23, 24, and 25 of walls 21 and 22.

A front wall 36 is provided for the cabinet 20 in which apertures 37 and 38 are formed to define the lighted areas. A pair of transparent panels 39 and 41 are mounted in the wall 36 by a pair of frames 42 and 43 which have slots 44 and 45 to receive the panels 39 and 41. In a manner similar to that disclosed in the first embodiment of the invention, characters of any desired pattern may be placed on the panels 39 and 41 to form charts for optical testing or otherwise. The outer edges of the frames 42 and 43 are provided with up-turned flanges 46 and 47 to form light shields similar to the light shields 13 and 14 of Fig. 1.

If only one lamp 27 is used in the cabinet 20, the lamp and its accompanying transformer 48 may be placed together in a casing 49 which can be easily removed for servicing. Suitable means such as spring detents or hooks, not shown, may be used to hold the casing 49 in an opening 51 in the front wall 36 of the casing 20. The casing 49 is provided with integral projecting walls 52 and 53 acting as light shields to restrict the light rays from the lamp 27 to the vicinity of the backgrounds 29 and 31.

Means for variably dimming the lamps shown in Figs. 1, 2, and 3, without altering the transverse distribution of the light with respect to the backgrounds illuminated thereby are provided as shown in Figures 4, 5, and 6 by a light shutter generally illustrated at 54. The shutter is composed of an inner tube 55 closely surrounding a tubular lamp 56 and an outer tube 57 slidably telescoped over the inner tube. Both the inner and outer tubes are provided with transverse slots 58 and 59, respectively, extending approximately half way around the circumference of the tubes and are axially located so that the slots 58 and 59 may be brought into registry by relative endwise movement of the tubes 55 and 57. Since the tubes 55 and 57 are restrained from relative rotation, only relative endwise motion is used to vary the intensity of light emanating from the lamp 56.

Although but certain embodiments have been shown and described in detail, it will be understood that other embodiments are possible and that changes may be made in the form and arrangement of the parts without departing from the spirit of the invention as defined in the appended claims.

I claim:

1. In a device of the class described, means for providing a substantially uniformly and diffusely illuminated background comprising an elongated, concave, semi-circular light-diffusing surface of substantially 180° of angular extent, an elongated source of diffuse light rays extending along one of the edges of said semicylindrical surface and substantially parallel to the axis thereof, and shield means for confining the light from said source substantially to an angle subtended by the background surface whereby the surface is uniformly illuminated.

2. In a device of the type described, the combination of means for providing a substantially uniformly illuminated background comprising an elongated, concave, semi-circular light-diffusing surface of substantially 180° of angular extent, a substantially circular tubular source of diffused light rays extending substantially parallel to the axis of the surface and coextensive therewith, said source being positioned along one edge of the surface with the center of the source located substantially at the intersection of the plane of the diameter of the circle and said surface, and shield means partially surrounding the source for confining the light rays to the angle subtended by the surface.

3. In a device of the class described, means for providing a substantially uniformly and diffusely illuminated background comprising a concave semicylindrical light-diffusing surface of approximately 180° of angular extent, and tubular fluorescent lamps located with the axes thereof extending along the longitudinal inner edges of said cylindrical surfaces at the same identical radius as said surfaces; a white sheet of roughened plastic material closely held against said cylindrical surface to provide a dull surface thereon, and seating abutments at the edges of said surfaces for retaining said plastic sheet in concave form against said cylindrical surface.

4. In a device of the class described, means for providing a substantially uniformly illuminated background comprising a concave substantially semicylindrical light-diffusing surface, a tubular fluorescent lamp extending along and coextensive with a longitudinal edge of said semicylindrical surface in such a manner that said edge longitudinally bisects said lamp, and means for variably dimming the light rays emanating from said lamp, said means including a pair of telescoping tubes slidably mounted on the lamp for longitudinal relative movement, said tubes being provided with registerable transverse open slots evenly disposed across said longitudinal edge whereby the intensity of illumination on said surface may be varied.

RAYMOND F. E. STEGEMAN.

REFERENCES CITED

The following references are of record in the file of this patent:

UNITED STATES PATENTS

| Number | Name | Date |
| --- | --- | --- |
| 1,005,898 | Stahl | Oct. 17, 1911 |
| 1,153,443 | Pole | Sept. 14, 1915 |
| 1,413,507 | Turner | Apr. 18, 1922 |
| 1,761,238 | Scott | June 3, 1930 |
| 1,900,551 | Guth | Mar. 7, 1933 |
| 2,254,718 | Welch | Sept. 2, 1941 |
| 2,305,892 | Newman | Dec. 22, 1942 |
| 2,308,986 | Livers | Jan. 19, 1943 |
| 2,335,951 | Mansell | Dec. 7, 1943 |
| 2,365,342 | Hilliard et al. | Dec. 19, 1944 |

FOREIGN PATENTS

| Number | Country | Date |
| --- | --- | --- |
| 270,184 | Germany | Feb. 10, 1914 |
| 709,505 | France | May 18, 1931 |
| 455,049 | England | Oct. 12, 1936 |